United States Patent

[11] 3,592,544

[72] Inventor Karl Brendel
 Rellingen, Holst., Germany
[21] Appl. No. 724,117
[22] Filed Apr. 25, 1968
[45] Patented July 13, 1971
[73] Assignee Lumoprint Zindler KG
 Hamburg, Germany
[32] Priority Apr. 28, 1967
[33] Germany
[31] L 56381

[54] EXPOSURE DEVICE
 11 Claims, 6 Drawing Figs.
[52] U.S. Cl. ............................................. 355/70,
 353/99, 355/66, 355/67
[51] Int. Cl. ........................................... G03b 27/54
[50] Field of Search .................................. 355/70, 30,
 43, 49, 51, 57, 60, 66, 67; 353/65, 66, 99

[56] References Cited
 UNITED STATES PATENTS
2,578,106 12/1951 Taylor ........................ 353/66
3,036,216 5/1962 Brody ........................ 355/30 (X)
3,146,661 9/1964 Young ........................ 355/57
3,357,300 12/1967 Cornell ...................... 353/99 (X)

Primary Examiner—Samuel S. Matthews
Assistant Examiner—Robert P. Greiner
Attorney—McGlew and Toren ABSTRACT: An exposure device for copying apparatus, with a light source and a reflector assembly, which reflector assembly is divided into a plurality of reflector surfaces which are of elongated shape and are provided with their longitudinal axes parallel to one another in a channellike arrangement, wherein the light source is displaced relative to the projection of an exposure opening and a reflector, with at least a part at the side of the device where the exposure opening is arranged about the light source, so that the light source is screened by this reflector surface from the exposure opening and wherein the reflector surfaces are so arranged that a part of the light beam is directed by means of two reflector surfaces to the exposure opening.

PATENTED JUL 13 1971  3,592,544

Inventor:
KARL BRENDEL

EXPOSURE DEVICE

The invention relates to an exposure device with at least one source of light in front of a reflector relative to an exposure opening. This invention concerns especially an episcopic exposure device for a copying machine and will be described in relation to such a machine.

It is known that one or several elongated sources of light can be arranged within a reflector laterally of and underneath the exposure opening, the axis of the reflector being directed towards the exposure opening.

Such an arrangement has several disadvantages. It demands a comparatively large distance from the source of light to the opening in order to correctly illuminate this or the screen arranged in or on it. With this arrangement, a far greater distance is necessary in a direction normal to the plane of the exposure opening, while too large a distance causes great disadvantages with regard to the indicatrix of the light intensity on the originals to be copied. Especially when using glazed paper originals, such a small angle of light incidence in the exposure opening would lead to relatively long exposure times.

Too near an arrangement of the lamp will cause an irregular light distribution over the length of the lamp, to such an extent that shadow marks will be noticeable as a consequence of the lamp suspension arrangements.

Besides these conditions, a lesser distance of the lamps from the exposure opening or shutter, which is usually enclosed by a transparent plate, will cause excessive heating to occur. The heating can only be held within acceptable limits by using expensive glass heat shields, as well as expensive heat-absorbing mirrors in the reflection system. The problem of heating with this sort of lighting arrangement is serious, and compact materials with a plurality of cooling fins for reflectors have been used. Such a practical indirect cooling method is based upon the assumption that the heat developed will be completely dissipated. At the same time, it has to be considered that a great amount of the heat is concentrated in the known reflectors which closely surround the larger part of the source of light.

The use of quartz-iodine lamps for a source of light is itself advantageous. However, the danger exists that this kind of lamp can sometimes burst. This means that the operators may be endangered, as very often a transparent plate in the exposure opening does not offer sufficient protection. It has to be remembered that the operator generally turns his face towards the illumination device.

Referring to the above-mentioned disadvantages, it has further been stated that the main problem, when manufacturing copying machines, which are usually used as desktop or table units, is, apart from satisfactory heat dissipation and safe arrangements, to provide as flat a component as possible. This arises not only from the desire to construct an apparatus as small and flat as possible, but also from the aim of arranging the parts of a copying machine as compactly as possible, i.e. avoiding empty spaces.

The invention solves the problems described by a channellike arrangement of the device, in which the reflector is divided into several reflector surfaces and at least a part of the light rays are directed by two reflector surfaces on to the exposure opening, the source of light being screened off by a reflector surface from the exposure opening, and an access opening for the image-ray being provided in a wall portion opposite the exposure opening.

In this way, first of all a satisfactory distribution of heat to several reflector surfaces is provided. The redirection of at least a part of the light rays also leads, with a comparatively closer arrangement of the light sources, to a greater effective distance. Further, it is possible to screen off, by virtue of the redirection of the light rays, so that protection for the operator is achieved.

With this, three appropriately longitudinally extending reflectors are provided, screening off the exposure opening by means of a transparent protection plate. Ventilation of the channellike construction is provided by means of a moving airstream, which flows directly over the reflectors, the sources of light and the protection plate. Through this arrangement, the heat is directly diverted from the parts where it is developed. At the same time, it has the advantage that a deposit of dust on the illumination arrangement is prevented, because the cooling airstream continuously blows away any dust particles. Furthermore, the reflectors can be constructed less compactly than those with cooling fins on the reverse side, which also demands more space in the apparatus and, further, using several and preferably three reflectors leads to a heat distribution over a larger surface.

In the construction in which the source of light is displaced laterally from the projection of the exposure opening perpendicularly to its plane, the source of light is, according to the invention, arranged to be relatively near to the plane of this opening and is provided within a parabolic reflector, which is arranged with its axis sharply inclined to the plane of the exposure opening, but coincident with the central perpendicular thereof. In the prolongation of this axis, a redirection reflector associated with a parabolic reflector, is provided on the further side from the exposure opening, which directs the combined rays from the parabolic reflector to the exposure opening.

The redirection reflector preferably ends on the projection of the exposure opening and has an upstanding marginal web for the arrangement of the source of light and of the image beam opening, so that the image-beam opening is screened off from direct illumination.

The screening off of the exposure opening is caused by directing the portion of the parabolic reflector nearest to the exposure opening in relation to the exposure opening and the source of light only so that it is impossible for direct incidence of light from the source of light to pass into the illumination opening. Especially, this portion of the parabolic reflector at the side facing the exposure opening has, on its end, a direction which is at an incline to the exposure opening, so that in case of the lamp bursting, glass splinters miss the exposure opening.

In accordance with a preferred feature, there is a third reflector for direct reflection of incident light rays to the exposure opening, which reflector is located on the side of the projection of the source of light further from the light source.

Advantageously, this reflector is constructed as a stepped reflector with mutually angled, striplike reflection surfaces in a displaced arrangement, which are disposed for direct reflection of incident light on to the exposure opening, but also are mutually staggered. By this means, a wall partition is provided, which runs parallel with the projection of the exposure opening.

These three reflectors preferably form at least partially the direct wall portions of a channellike housing.

Fixing means or frame parts can be constructed as thin-walled components. The invention preferably includes the direct construction of the reflectors as wall parts because the dissipation of heat is improved.

By means of this channellike housing of the exposure device, a unitary construction is created which is desirably furnished with guide means and serves as an adjustable and movable unit in a copying machine. Such a construction enables extremely simple adjustment in dependence upon focal distance tolerances of the objective, without changing the arrangement of the reflectors.

When using two quartz-iodine lamps, they are arranged at a distance from one another, each immediately at one end of the channellike housing, and the middle gap between the two quartz-iodine lamps amounts to about half the length of such a lamp.

BRIEF DESCRIPTION OF THE DRAWINGS

The invention is explained in more detail by means of an embodiment, which indicates the advantages of the exposure arrangement in relation to a copying machine, which is shown in the accompanying drawings; in the drawings.

DESCRIPTION OF THE PREFERRED EMBODIMENT

Figure 1:
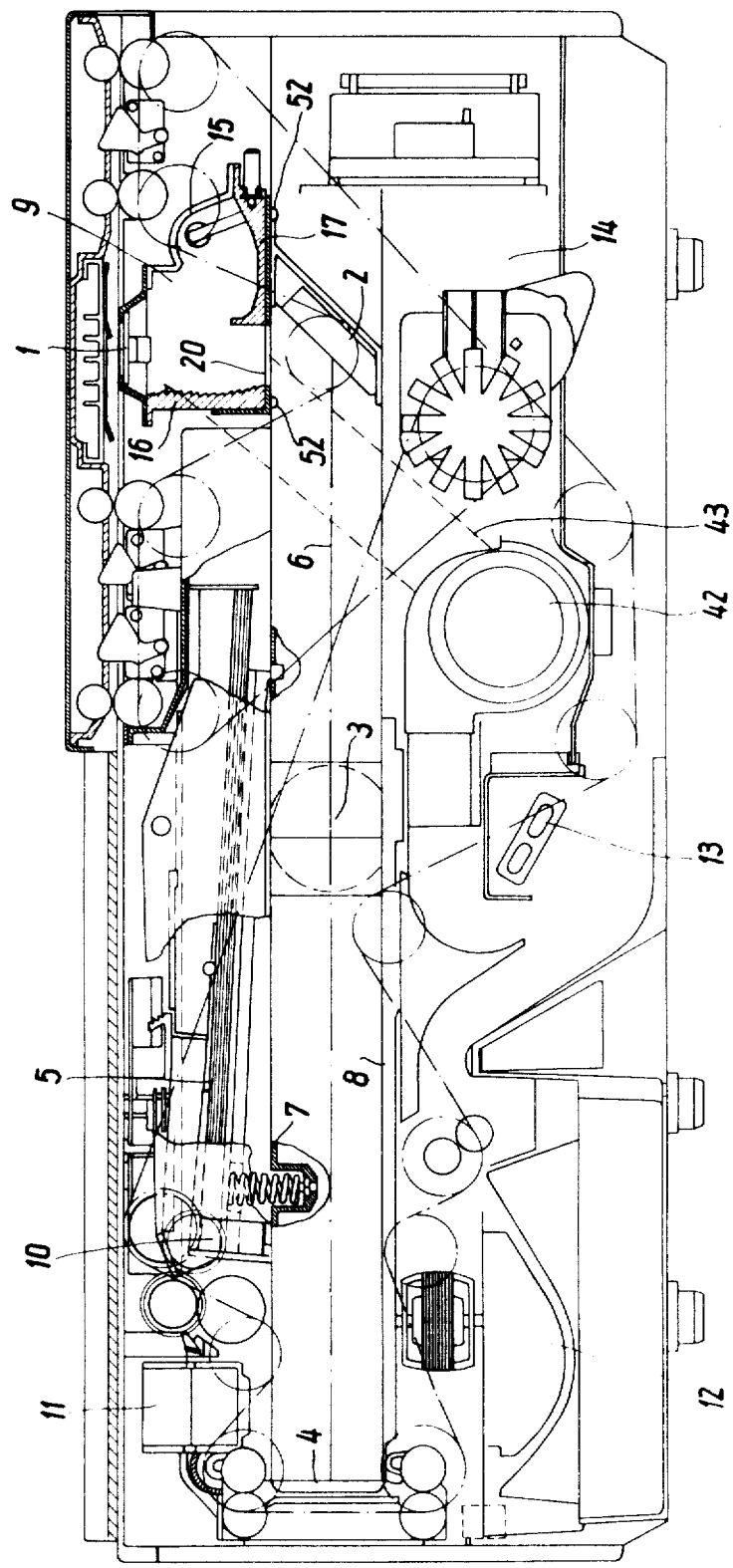
FIG. 1 shows a side view of a copying machine in cross section, partly broken away and in diagrammatic form.

FIG. 1 shows a compactly constructed copying machine. It is provided with an exposure opening 1 on the upper side and if necessary under a frame, appropriately enclosed by a strip-shaped transparent mounting plate so that the larger extent of the opening lies in a direction perpendicular to the plane of the drawing. For example, the exposure opening 1 has a length of about 2 cm. and a width of about 23 cm. Vertically under the exposure opening a redirecting mirror 2 is provided, by which the light beam is passed through an objective 3 to an imaging surface 4, to which during exposure the copy paper is fed from a paper supply stack 5. The horizontal part of the image-forming beam 6 passes through a housing portion which is defined by upper and lower partition walls 7, 8 which divide the housing in various portions. Above this partition wall arrangement, an exposure device 9 is situated and also the already mentioned stack 5 in a sheet-feeding arrangement 10 and, through the use referred to of an installation for the purpose of producing copies by electrophotographic means, there is also a sensitizing mechanism 11. Beneath the partition walls 7, 8, there are arranged a developer device 12, a fixing device 13 with heaters and a supply mechanism 14 with electric motors, ventilation fans and a voltage source for the sensitizing device 11. The blower for the ventilator arrangements is indicated at 42.

The apparatus shows that its length is determined generally by the desired length of the imaging ray 6 and also that the generally upwardly arranged structures, the sheet feeder and the sensitizer are comparatively flat. Therefore, it is preferable for the exposure device 9 to have no considerable constructional height, which is achieved by the exposure device 9 of the invention.

Figure 3:
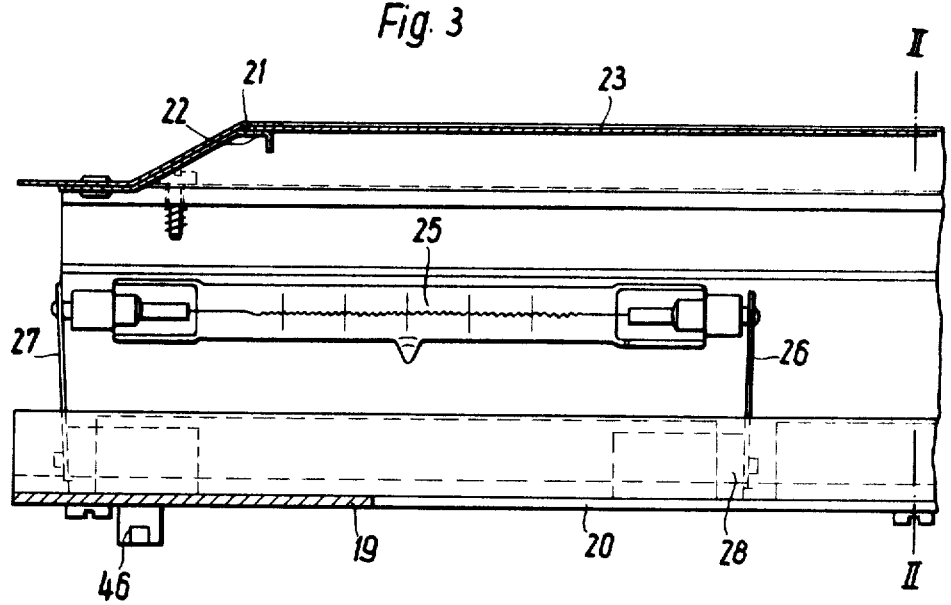
FIG. 3 shows a cross section along the line III–III in FIG. 2, in fragmentary fashion.
Figure 2:
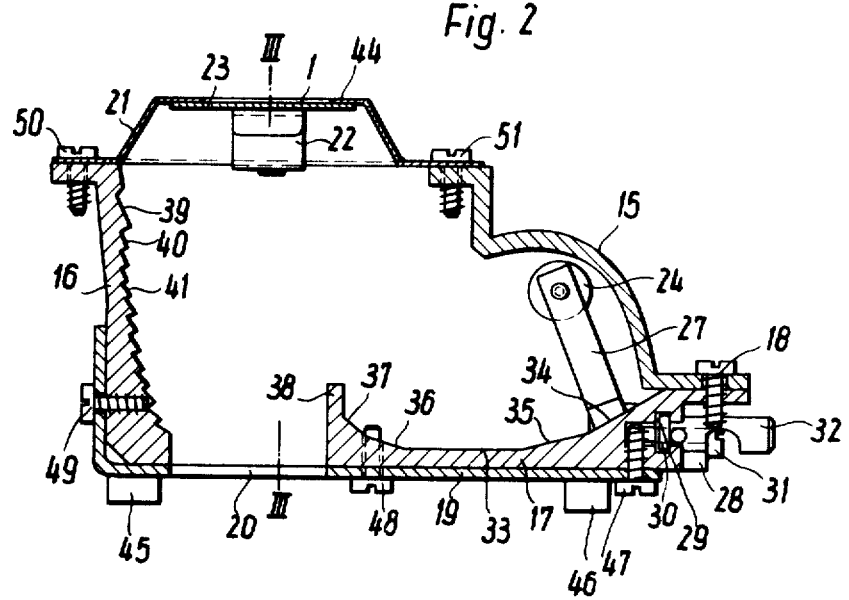
FIG. 2 shows a side view of the channellike illuminating arrangement in central section along the line II–II in FIG. 3.

This is described in relation to FIGS. 2 and 3 in more detail, where the same parts are marked with the same references as in FIG. 1.

Partition walls of the channellike housing are formed directly by a parabolic reflector 15 and a stepped reflector 16. Below the parabolic reflector 15 is the so-called redirection reflector 17. Both parts are attached directly to each other, for instance by screws 18. A support plate 19 is attached to the reflector 17, for instance by means of screws 47, 48, and it is also connected to the nearer end of the stepped reflector 16 by means of screws 49. The plate 19 includes an opening 20 for the imaging ray, which is reflected through the exposure opening 1, from an original located there.

The exposure opening 1 is arranged in a cover plate 21 secured to the reflectors 15, 16 for instance by screws 50, 51, to which cover plate 21 a transparent protection plate 23 is fixed, for instance at the ends by means of brackets 22.

At the focal point of the parabolic reflector 15, the source of light 24 is provided in form of two quartz-iodine lamps arranged on a common axis, one of which is shown in FIG. 3 at 25. FIG. 3 also shows that the quartz-iodine lamps, viewed from the ends of the channellike housing and relative to the middle line, corresponding to the section line II–II, leave a free distance of about one-fourth the length of a lamp. The lamps 25 are held in position by contact arms 26, 27, the contact arms 27 of which, arranged on the ends, pass outside the reflectors 17 and the middle ones 26 of which pass through apertures in the reflector to the insulator blocks 28. The insulators 28 are fastened to the reflector by means of a square nut 30, held nonrotatably in a longitudinal groove 29 in the reflector 17 and by means of a screw 31. Mounting of the lamps is thus achieved by simple means. The current supply passes via laminated contacts, of which one is shown at 32.

It can be seen that the optic axis A of the parabolic reflector 15 is sharply inclined to the plane of the exposure opening 1, namely downwardly, but intersects the median B perpendicular to the plane of exposure opening, corresponding to the section line III–III at an angle α.

Furthermore, it can be seen that the upper section or flange of the parabolic reflector, which is directed toward the exposure opening 1, is taken so far that it screens the exposure opening 1 from direct illumination and also has a continuous direction from the plane of the exposure opening 1, whereby screening of the exposure opening 1 is achieved. The other lower portion of the parabolic mirror (reflector) 15 is made longer.

The optic axis of the parabolic reflector ends at a plane surface 33 of the reflector 17 parallel to the exposure opening 1. At this plane, upstanding reflector portions lie in a direction parallel to the plane of the drawing or perpendicular to the axis of the elongated source of light and parallel to the plane surface 33, which consist of angularly displaced, advantageously planar surface strips 34, 35, 36, 37. Their inclination is so dimensioned that they reflect incident light to the exposure opening, as will be described. These surface portions are mainly provided for the reflection of direct rays to the source of light and also can be correspondingly curved.

The upstanding portions 36, 37 end in a marginal rim 38 which lies below the vertical projection of the exposure opening 1 and is so high that direct rays from the source of light 24 are prevented from passing to the imaging opening 20.

The stepped or corrugated reflector 16 has several striplike reflection surfaces, 39, 40, 41... which extend perpendicular to the plane of the drawing surface, viz. longitudinally of the reflector, and thus are so inclined towards the exposure opening 1 that they guide incident light thereto. These reflection surfaces are arranged to be mutually stacked in such a manner that they lie substantially in vertical plane.

It can be seen that a channellike housing is thus constructed which is closed at its longitudinal sides and at the top to the exposure opening.

From the bellows device 42, through a channel 43 (FIG. 1), a cooling airstream passes to the rear end of the channellike housing, in order to blow in cooling air, which can be extracted at the front through the housing wall (not shown).

With this embodiment, the imaging opening 20 can also be provided with a transparent cover.

Figure 4:
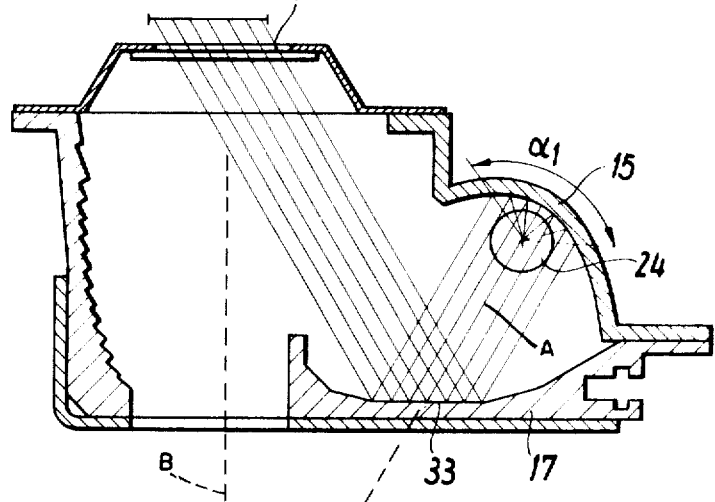
FIGS. 4, 5 and 6 show views corresponding to FIG. 2 for showing the light paths via the various reflectors.

FIG. 4 shows the course of the rays from the source of light 24 to the parabolic reflector 15, which receives the comparatively large emission angle α1 and directs the resultant parallel beam of light to the planar surface 33 of the redirection reflector 17, so that the light is directed by such reflector towards the exposure opening 1. It can be seen that, because of these components, the light is uniformly distributed.

Figure 5:
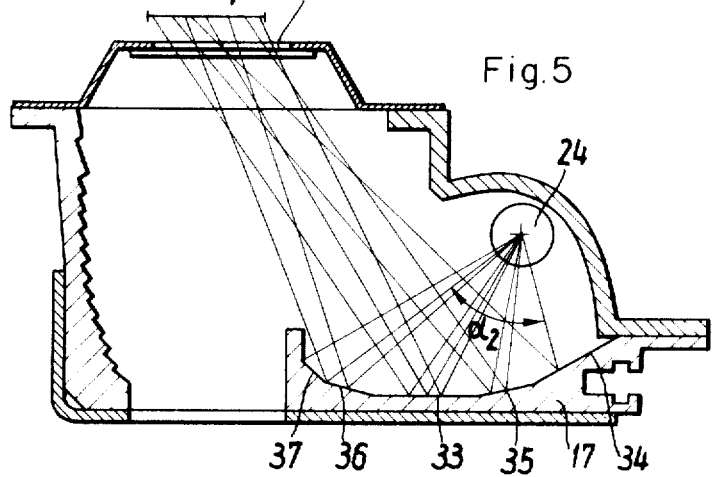

FIG. 5 shows that, in the region of an emission angle α2, the light which is thrown directly on to the reflector 17, both on the flat reflection surface 33 and also by the inclined adjacent portions 34—37, is directed to the exposure opening 1. The portions 34—37 are for the purpose of enlarging the emission angle α2 to more than it would be by means of the flat reflection surface 33 alone.

Figure 6:
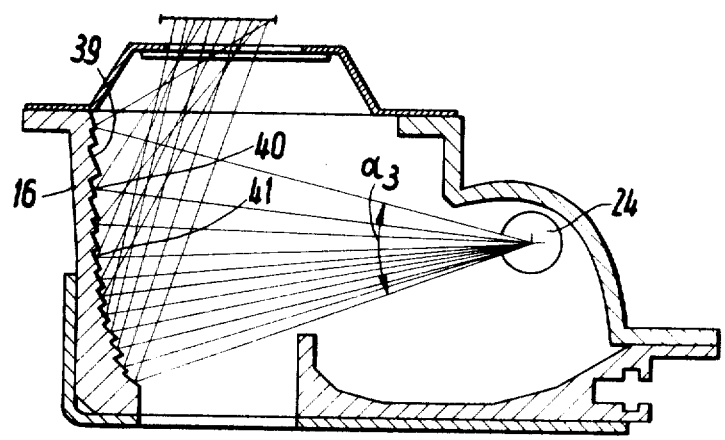

According to FIG. 6, light in an emission angle α3 is thrown on to the stepped reflector 16 and is directed into the exposure opening by the individual reflection strips 39, 40, 41....

The rays indicated show that the exposure opening 1 is evenly illuminated and also that a comparatively wide angle of incidence is achieved. Furthermore, the effective or operative distance of the source of light 24 from the exposure opening 1 is comparatively large, although the source of light 24 is located comparatively near to the plane of this opening. For example, the distance from the plane is equal to or greater than the lateral distance from the vertical projection of the adjacent rim 44 to the exposure opening 1.

The illumination of the exposure opening 1 is attained by the superposition of the three portions of light corresponding to the emission angles α1, α2 and α3. The sum of these emission angles is greater than can normally be attained with a reflector.

Heating of the protection plate or transparent plate 23, in the arrangement shown, is also comparatively slight, apart from the fact that, in the way described, excellent cooling is possible.

According to FIGS. 2 and 3, guide rails 45, 46 are arranged on the under side of the plate 19, which, as shown in FIG. 3, are suitably profiled and permit movement of the apparatus on a rail system 52, in the machine. Such a system is arranged on the partition wall 7, for instance.

I claim:

1. An incident light exposure device comprising, in combination, at least one light source; reflector means in light reflection relation with said light source; said reflector means including a plurality of elongated reflector surfaces having their longitudinal axes extending parallel to each other, said reflector surfaces being provided in a channellike arrangement; said channellike arrangement having, on one side, an elongated exposure opening adapted to have light rays from said light source directed therethrough, and having, on an opposite side, an image ray opening through which light rays, reflected through said exposure opening, are directed; means mounting said light source offset laterally to one side of said exposure opening; a reflector arranged above said light source and having a reflecting surface extending into the path of light rays from said light source directed through said exposure opening so that said light source is screened from said exposure opening; said reflector surfaces being so positioned, relative to said light source and said exposure opening, that light rays from said light source are redirected, by means of said reflector surfaces, through said exposure opening.

2. A device, as claimed in claim 1, in which first, second and third reflector surfaces form at least part of the walls of a channel-shaped housing; means connecting said first and third reflector surfaces directly to each other; and wall elements connecting said first reflector surface to said second reflector surface and connecting said second reflector surface to said third reflector surface; said exposure and image ray openings being formed in said wall elements.

3. A device, as claimed in claim 2, including a transparent protective screen at said exposure opening; a fan; and an air guide duct connecting said fan to said channel-shaped housing, whereby a direct air-cooling stream is provided for said reflectors, said light source and said protective screen.

4. A device, as claimed in claim 2, in which said light source is mounted relatively close to the plane of said exposure opening; said reflector arranged above said light source being a parabolic reflector having its axis inclined at an acute angle to the plane of said exposure opening and extending toward the median perpendicular to the plane of said exposure opening; said reflecting surfaces including a redirecting reflector intersecting the axis of said parabolic reflector and facing said exposure opening to direct light rays from said parabolic reflector through said exposure opening.

5. A device, as claimed in claim 2, in which said light source comprises two relatively elongated quartz-iodine lamps arranged on a common axis extending parallel to the longitudinal axes of said reflector surfaces; said quartz-iodine lamps being positioned along said common axis at a mutual spacing wherein the adjacent ends of said lamp are spaced apart a distance substantially equal to from one quarter to one half the length of one lamp.

6. A device, as claimed in claim 4, in which said redirecting reflector includes a substantially flat reflector surface extending parallel to said exposure opening; said light source being relatively elongated; said redirecting reflector including reflector surfaces inclined relative to the plane of said exposure opening and having their longitudinal axes extending parallel to the longitudinal axis of said flat reflector surface.

7. A device, as claimed in claim 6, in which said redirecting reflector terminates laterally at said projection of said exposure aperture in an upstanding rim adjacent said image ray opening and positioned to screen said image ray opening from direct illumination from said light source.

8. An incident light exposure device comprising, in combination, at least one light source; said reflector means operatively associated with said light source; said reflector means including a plurality of relatively elongated reflector surfaces having their longitudinal axes extending parallel to each other, said reflector surfaces being provided in a channellike arrangement; said channellike arrangement having, on one side, a relatively elongated exposure opening adapted to have light rays from said light source directed therethrough, and having, on an opposite side, an image ray opening through which light rays, reflected through said exposure opening, are directed; means mounting said light source laterally to one side of the exposure opening; a reflector arranged above said light source and having a reflecting surface extending into the path of light rays from said light source directed through said exposure opening so that said light source is screened from said exposure opening; said reflector surfaces being positioned, relative to said light source and said exposure opening, that light rays from said light source are redirected, by means of said reflector surfaces, through said exposure opening; said reflector surfaces being divided into three reflector surfaces which form at least part of the walls of a channel-shaped housing; said three reflector surfaces including a reflector at that side of the projection of the exposure aperture opposite to said light source, and reflecting light from said light source incident thereon directly through said exposure opening.

9. A device, as claimed in claim 8, in which said last named reflector is constructed as a stepped reflector having angled, mutually displaced, strip form, light reflector surfaces which are disposed in an arrangement for direct reflection of light rays, incident thereon from said light source, through said exposure opening, but which are stepped relative to each other.

10. An incident light exposure device comprising, in combination, at least one light source; reflector means operatively associated with said light source; said reflector means including a plurality of relatively elongated reflector surfaces having their longitudinal axes extending parallel to each other, said reflector surfaces being provided in a channellike arrangement; said channellike arrangement having, on one side, a relatively elongated exposure opening adapted to have light rays from said light source directed therethrough, and having, on an opposite side, an image ray opening through which light rays, reflected through said exposure opening, are directed; means mounting said light source laterally to one side of the exposure opening; a reflector arranged above said light source and having a reflecting surface extending into the path of light rays from said light source directed through said exposure opening so that said light source is screened from said exposure opening; said reflector surfaces being positioned, relative to said light source and said exposure opening, that light rays from said light source are redirected, by means of said reflector surfaces, through said exposure opening; said reflector surfaces being divided into three reflector surfaces which form at least part of a channel-shaped housing; guide means on said housing operatively associated with a rail system in a copy apparatus in which said channel-shaped housing is disposed, said guide means being movable along said rail system for adjusting the relative position of said channellike arrangement, as a unit, in the copy apparatus.

11. An incident light exposure device, having at least one light source and associated reflective means arranged between an exposure aperture and an image ray aperture opposite the exposure aperture, the light source being offset laterally relative to the projection of the exposure aperture perpendicular to the plane thereof; the improvement comprising, in combination, said reflector means including plural reflectors forming part of the wall portions of a relatively elongated channel-shaped housing having said apertures arranged therein; means mounting said light source near the plane of said exposure aperture inside a parabolic reflector of said housing, and whose axis forms an acute angle with the perpendicular to the plane of said exposure aperture; a deflecting reflector of said housing, arranged beneath said light source; and a third reflector of said housing arranged on the side of said exposure aperture opposite said light source, and forming a reflector for direct reflection of rays, coming from said light source, through said exposure aperture.